(12) United States Patent
Yoon et al.

(10) Patent No.: US 6,995,811 B2
(45) Date of Patent: Feb. 7, 2006

(54) BRIGHTNESS IMPROVING APPARATUS FOR PROJECTION TELEVISION

(75) Inventors: Seok-il Yoon, Daejeon Metropolitan (KR); Gyu-hwan Hwang, Hwanseong-gun (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 574 days.

(21) Appl. No.: 10/321,713

(22) Filed: Dec. 18, 2002

(65) Prior Publication Data
US 2003/0142242 A1    Jul. 31, 2003

(30) Foreign Application Priority Data
Dec. 18, 2001    (KR) ................................ 2001-80903

(51) Int. Cl.
*H04N 5/74* (2006.01)

(52) U.S. Cl. ...................... 348/759; 359/457; 359/460; 349/61

(58) Field of Classification Search ................ 348/744, 348/750, 751, 756, 759, 800; 359/350, 452, 359/453, 455, 456, 457, 460; 250/365; 349/61; H04N 5/74
See application file for complete search history.

(56) References Cited

U.S. PATENT DOCUMENTS

| 4,059,767 A | * | 11/1977 | Macovski | ................ 250/461.1 |
| 4,872,750 A | * | 10/1989 | Morishita | ....................... 353/7 |
| 5,504,598 A | * | 4/1996 | Sprague et al. | ............... 349/57 |

FOREIGN PATENT DOCUMENTS

| JP | 6-303625 A | 10/1994 |
| JP | 2001-264880 A | 9/2001 |

* cited by examiner

*Primary Examiner*—Michael H. Lee
(74) *Attorney, Agent, or Firm*—Sughrue Mion, PLLC

(57) ABSTRACT

A high-brightness projection television is provided which includes a screen having a first lens for refracting an incident beam into a convergent beam, a second lens for refracting the beam refracted by the first lens into a divergent beam, and a protection plate for protecting at least the second lens, wherein an optical emission material is included in at least one of the above elements to convert invisible lights included in the incident beam into visible lights. Alternatively, the projection television may include an optical emission layer having the optical emission material between a light source and an image generator such as a liquid crystal display (LCD). Accordingly, vertical and horizontal angles of view are increased and overall brightness of the image is improved.

22 Claims, 9 Drawing Sheets

BRIGHTNESS IMPROVING APPARATUS FOR PROJECTION TELEVISION

BACKGROUND OF THE INVENTION

This application claims the priority of Korean Patent Application No. 2001-80903, filed Dec. 18, 2001 in the Korean Intellectual Property Office, which is incorporated herein in its entirety by reference.

1. Field of the Invention

The present invention relates to a projection television, and more particularly, to a projection television with improved brightness to realize a high level of brightness while widening horizontal and vertical angles of view.

2. Description of the Related Art

Image display devices, such as projection televisions or video projectors, are image projection systems that generate images by using image generation means, such as small-sized cathode ray tubes (CRT), liquid crystal displays (LCD), and polymer dispersion liquid crystals (PDLC) as image sources. The image projection systems magnify and project the images onto a large screen to display desired images. Due to the advantages of providing large-sized images, the demand for projection televisions and video projectors has been increasing.

An image projection system is classified as either front-type or rear-type, according to the method of magnifying and projecting images onto the screen.

Figure 1:
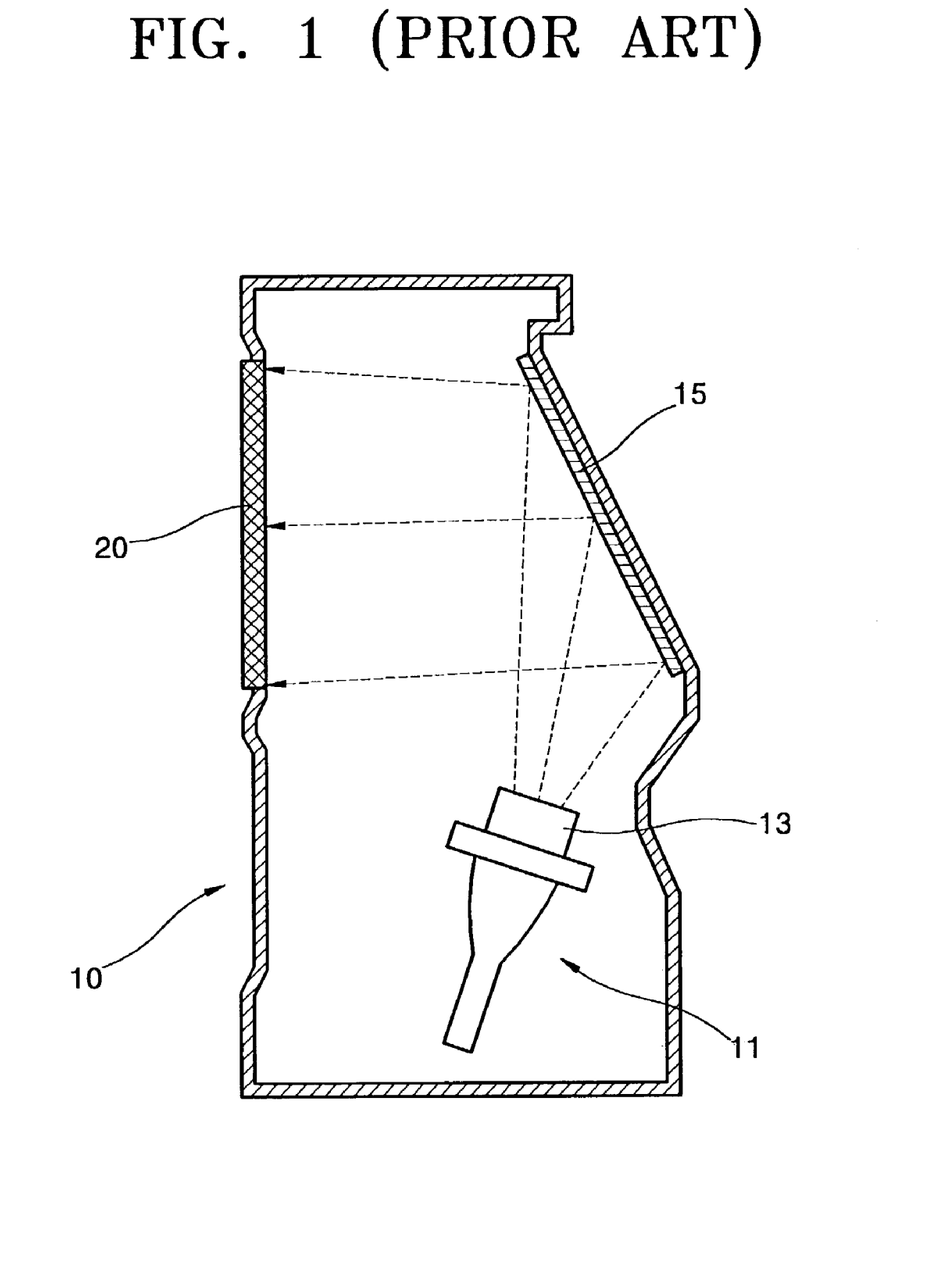
FIG. 1 is a schematic sectional view illustrating a conventional rear-type projection television.

Referring to FIG. 1, a conventional rear-type projection television includes a cabinet 10, a screen 20 installed on the front surface of the cabinet 10 to form images, and an image generation means 11, such as a CRT, which is installed in the cabinet 10, to generate and radiate the images. The rear-type projection television also includes a projection lens unit 13 for magnifying and projecting the images radiated from the image generation means 11, and a mirror 15 for reflecting the images projected from the projection lens unit 13 toward the screen 20. In the projection television, since the images are projected from the rear surface of the screen 20 in the rear-type projection television, viewers watch the images in front of the screen 20.

In general, a plurality of viewers watch the images displayed on the screen of the image projection system from various angles in a horizontal plane. Accordingly, it is preferable that the images are distributed across a wide range of angles in a horizontal plane.

Consequently, the optical characteristics of the screen of a projection television largely determine the image quality. In particular, the optical characteristics of the screen of a projection television are more important for a large projection television such as a high-definition television (HD-TV), which produces high-definition images.

Figure 2:
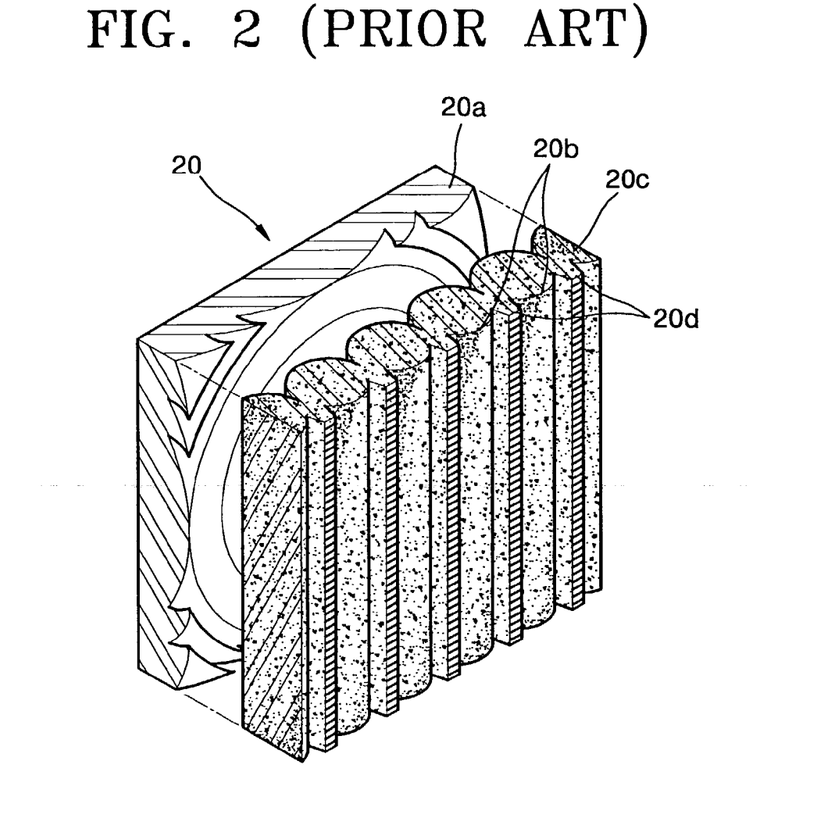
FIG. 2 is a schematic perspective view illustrating the constitution of a screen of the conventional rear-type projection television of FIG. 1.
Figure 3:
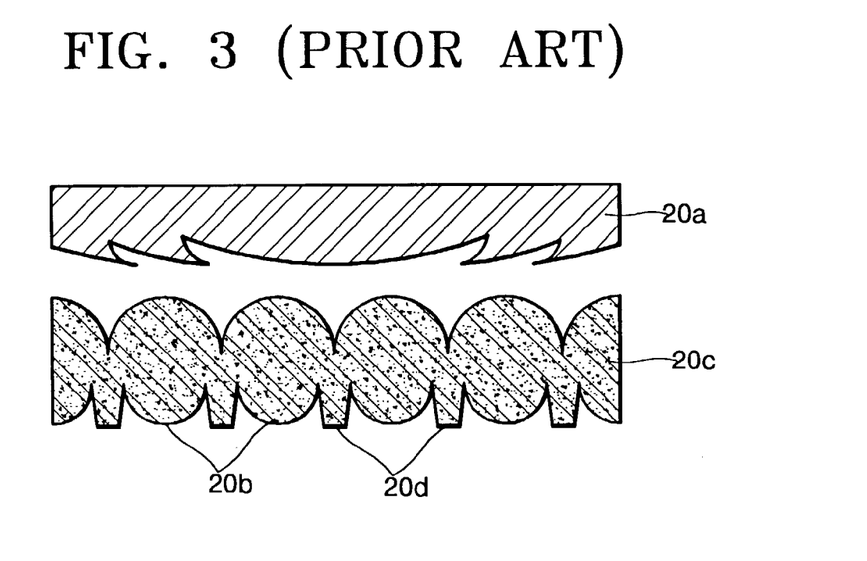
FIG. 3 is a plan view of FIG. 2.

Referring to FIGS. 2 and 3, the screen 20 of the projection television of FIG. 1 includes a Fresnel lens 20a for converting light incident from the projection lens into a parallel beam. Consequently, image signals formed in the image generation means 11 are displayed through an image projection optical path on the screen 20 as an image with uniform brightness over a large angle of view. In addition, a lenticular lens 20c is adjacent to the front surface of the Fresnel lens 20a. The lenticular lens 20c is used as a light spreading means formed by connecting a plurality of convex unit lenses 20b in parallel. The lenticular lens 20c diverges the parallel beam projected from the Fresnel lens 20a. Each connection portion of the unit lenses 20b of the lenticular lens 20c has a ridge portion 20d on which black stripes are processed.

A front protection plate (not shown) is arranged in front of the lenticular lens 20c to protect the Fresnel lens 20a and the lenticular lens 20c from scratching and dust. Also, the front protection plate is used to improve the contrast of the images.

The front protection plate is formed of a transparent material such as acryl so that images formed on the lenticular lens 20c may be viewed from the outside.

In addition, divergent agents (not shown) such as glasses or polymers may be included in the convex shape unit lens 20b to improve vertical and horizontal angles of view of the lenticular lens 20c.

According to the conventional screen, although the angle of view is increased by the divergent agents, optical transmittance by backward scattering, reflection, or absorption of image light is decreased, thereby lowering brightness.

SUMMARY OF THE INVENTION

To solve the above-described problems, it is an aspect of the present invention to provide a high-brightness projection television for obtaining a high-brightness image while securing a wide angle of view.

An apparatus consistent with the present invention relates to a rear-type high-brightness projection television including a light source, an image generation means for forming a predetermined image, a first projection lens unit for magnifying and projecting the image generated in the image generation means, a reflection means for reflecting the image projected from the first projection lens unit, a screen on which the image reflected from the reflection means is displayed, and/or an optical emission means arranged between the light source and the image generation means to convert invisible lights incident from the light source into visible lights and to emit the visible lights.

The optical emission means is an optical emission layer having a high transmittance, which absorbs ultraviolet and near ultraviolet lights to emit visible lights. The optical emission layer is a fluorescent layer in which a predetermined amount of fluorescent substance is uniformly distributed.

The reflection means includes a first mirror for bending an optical axis of an image projected from the first projection lens unit and a second mirror for reflecting the image projected from the optical conversion means to the screen. In addition, a second projection lens unit is further included between the first mirror and the second mirror.

The present invention further provides a rear-type high-brightness projection television including a first lens means for refracting an incident beam into a convergent beam, a second lens means for refracting the beam refracted by the first lens means into a divergent beam, and a protection plate for protecting at least the second lens means, wherein an optical emission material is embedded on at least one of the first lens means, the second lens means, and the protection plate to convert invisible lights included in the incident beam into visible lights.

The optical emission material is embedded in a region of the second lens means that is adjacent to the protection plate, in a region of the second lens means that is adjacent to the first lens means, in regions of the second lens means that are adjacent to the protection plate and the first lens means, or in a region of the first lens means that is adjacent to the second lens means.

In the case where the optical emission material is embedded in the region of the first lens means that is adjacent to the second lens means, a divergent agent for diverging the incident beam is embedded in a region of the second lens means that is adjacent to the first lens means.

The optical emission material is a fluorescent substance that converts ultraviolet and near ultraviolet lights into visible lights.

According to the present invention, the vertical and horizontal angles of view of the projection television are increased and the brightness of the image is improved.

BRIEF DESCRIPTION OF THE DRAWINGS

The above aspects and advantages of the present invention will become more apparent by describing in detail non-limiting embodiments thereof with reference to the attached drawings in which.

DETAILED DESCRIPTION OF THE INVENTION

The present invention will now be described more fully with reference to the accompanying drawings, in which illustrative preferred embodiments of a high-brightness projection television for securing a wide angle of view and high-brightness are shown. In the drawings, the thickness of layers and regions may be exaggerated for clarity.

<First Embodiment>

Figure 4:
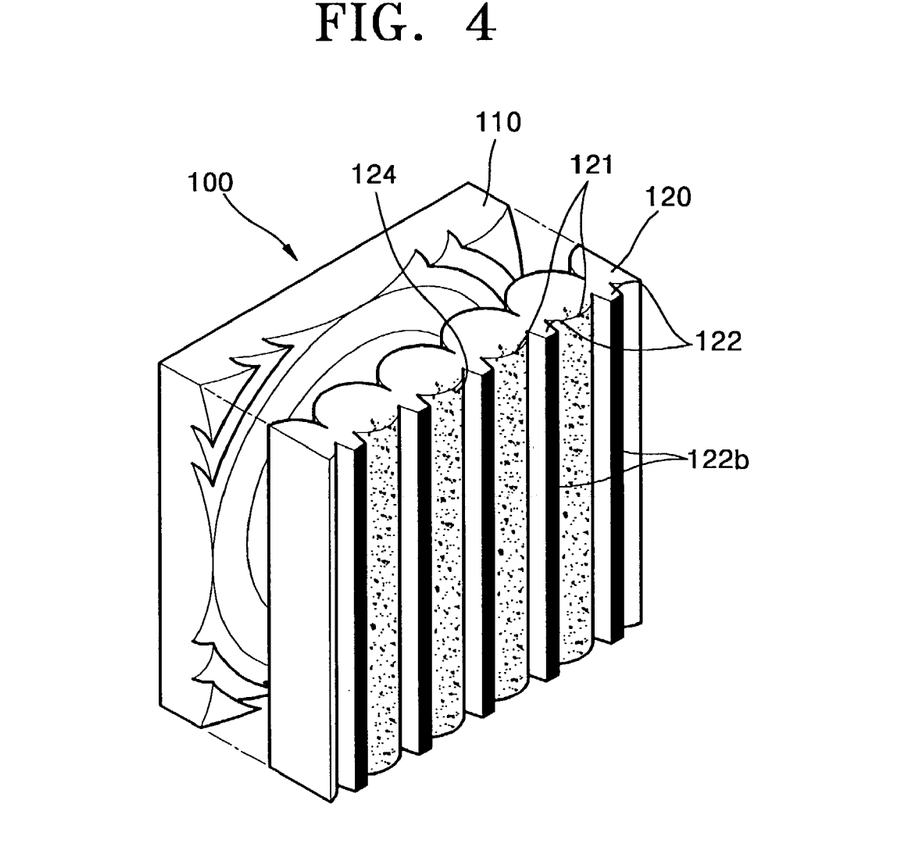
FIG. 4 is a perspective view illustrating a first embodiment of a screen of a rear-type high-brightness projection television according to the present invention.

Referring to FIG. 4, a first embodiment of a screen 100 of a high-brightness projection television according to the present invention includes a first lens means 110 and a second lens means 120. The first lens means 110 is arranged to refract an incident beam into a convergent beam, and it is preferable that the first lens means 110 is a Fresnel lens that converts an incident beam having predetermined image information from a projection apparatus into a parallel beam. The second lens means 120 is arranged to refract the beam refracted by the first lens means 110 into a divergent beam. It is preferable that the second lens means 120 is a lenticular lens, in which a plurality of convex unit lenses 121 are connected in parallel. In addition, parallel connection portions of the unit lenses 121 include ridge portions 122. Black stripes 122b are formed by painting black ink on front surfaces of the ridge portions 122. The lenticular lens diverges the parallel beam incident from the Fresnel lens to form images. In this case, the black stripes 122b absorb a portion of light incident from the outside to improve contrast of the image formed on the front surface of the lenticular lens.

In addition, the front surface of the second lens means 120 includes a predetermined optical emission material 124. The front surface of second lens means 120 is adjacent to a protection plate (not shown), such as an anti-reflection film or an anti-glare (AG) film. Here, the protection plate protects the second lens means 120 and/or the first lens means 110 from contamination and helps prevent annoying reflection of light from the outside.

Figure 5:
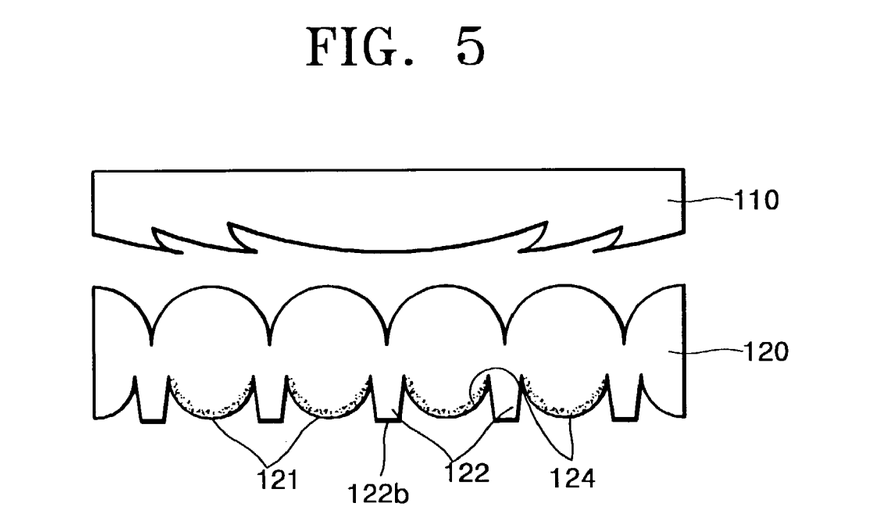
FIG. 5 is a plan view of FIG. 4.

In particular, referring to FIGS. 4 and 5, the optical emission material 124 is embedded in the prominent portions of the convex unit lenses 121 between the ridge portions 122 and uniformly distributed along the convex unit lenses 121.

It is preferable that the optical emission material 124 is a fluorescent substance that absorbs light having a predetermined wavelength, i.e., ultraviolet (UV) or near ultraviolet (365 nm), to emit visible lights. It is preferable that the fluorescent substance is at least one material selected from the group consisting of blue fluorescent substances such as ZnS:Ag, green fluorescent substances such as $ZnSiO_4$:Mn, and red fluorescent substances such as $Zn_3(PO_4)_2$:Mn. In the case that the fluorescent substance is formed of more that two kinds of fluorescent substances that emit different fluorescent beams, it is preferable that the mixing ratio of the fluorescent substances is determined according to the chromaticity of the projection television. In addition, since it is possible that a specific color becomes a background color, contrast can be improved.

Meanwhile, the optical emission material 124 may be any material using the afterglow characteristics of the fluorescent substance.

The optical emission material, along with the fluorescent substance, improves the brightness of the screen by converting the ultraviolet and the near ultraviolet into visible lights, and operates as an existing divergent agent to diverge the incident beam. Consequently, it is preferable that the optical emission material 124 is formed in a predetermined size to efficiently diverge the beam while not limiting the fluorescent characteristics.

As described above, in the case that the optical emission material 124 is embedded in the screen and has the fluorescent characteristics and optical divergent characteristics, the brightness, and the horizontal and vertical angles of view are improved.

Screens according to second through seventh embodiments of a screen according to the present invention are the same as the above-described first embodiment of a screen according to the present invention except for the portions in which the fluorescent substances are embedded. Accordingly, the following descriptions of second through seventh embodiments of screens will be limited to the portions in which the fluorescent substances are embedded.

<Second Embodiment>

Figure 6:
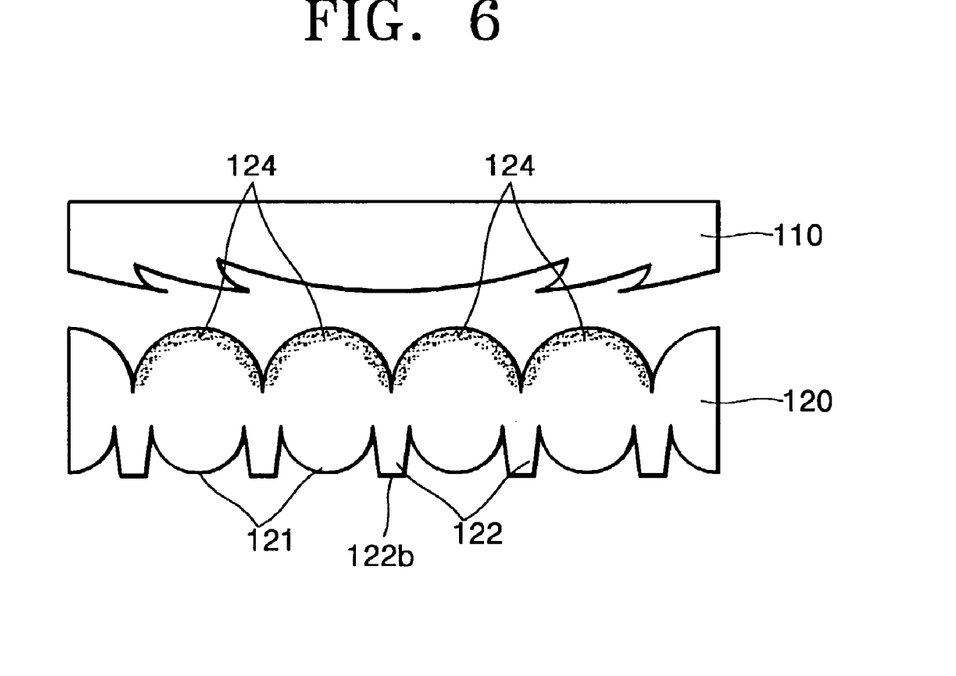
FIG. 6 is a plan view illustrating a second embodiment of a screen of a rear-type high-brightness projection television according to the present invention.

Referring to FIG. 6, the optical emission material 124, according to the first embodiment, is embedded in the back surface of the second lens means 120 that is adjacent to the first lens means 110.

In particular, the optical emission material 124 is embedded in convex portions of the second lens means 120 that face the first lens means 110. In this case, it is preferable that the optical emission material 124 is embedded along the surface of the second lens means 120 and uniformly distributed from the top to the bottom of the second lens means 120.

<Third Embodiment>

Figure 7:
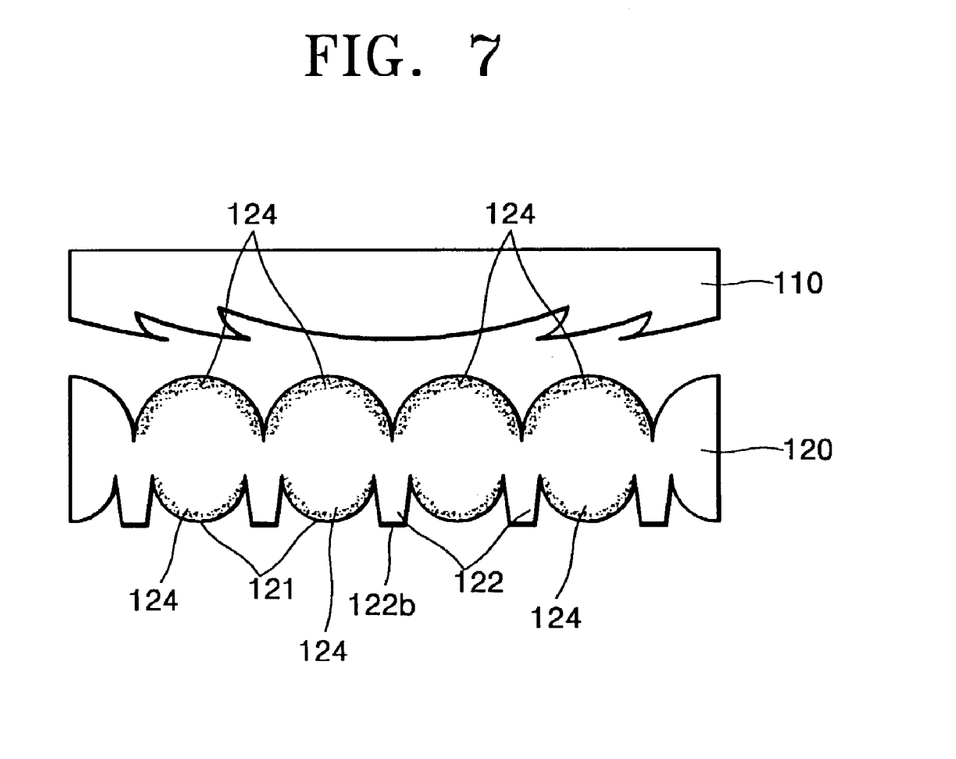
FIG. 7 is a plan view illustrating a third embodiment of a screen of a rear-type high-brightness projection television according to the present invention.

Referring to FIG. 7, a third embodiment of a screen according to the present invention is formed by combining the first and second embodiments. In this case, the optical emission material 124 is embedded both in the optical emission surface of the second lens means 120 that is adjacent to a protection plate (not shown) as well as in convex portions of the surface of the second lens means 120 that is adjacent to the first lens means 110. In this case, it is preferable that the same optical emission material 124 is arranged on both surfaces of the second lens means 120. However, it is possible that the fluorescent characteristics or the size of the optical emission material 124 embedded on either side of the second lens means 120 are different.

For example, one fluorescent substance selected from the group consisting of red, green, and blue fluorescent substances is embedded in the convex portions of the second lens means 120 that are adjacent to the protection plate, while another fluorescent substance selected from the same group is embedded in the convex portions of the second lens means 120 that are adjacent to the first lens means 110. In this case, the sizes of the fluorescent substances embedded in the convex portions on either side of the second lens means 120 may or may not be equal.

<Fourth Embodiment>

Figure 8:
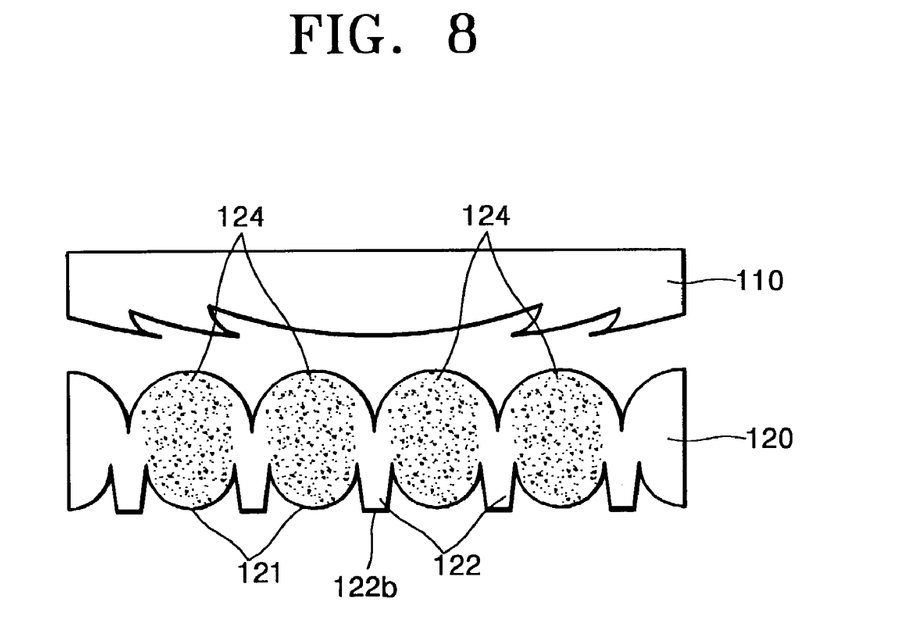
FIG. 8 is a plan view illustrating a fourth embodiment of a screen of a rear-type high-brightness projection television according to the present invention.

Referring to FIG. 8, the fluorescent substance 124 is uniformly embedded throughout the entire area of the second lens means 120 except for the ridge portions 122.

<Fifth Embodiment>

A fifth embodiment of a screen according to the present invention includes both an optical emission material and a divergent agent. In this case, since the divergent agent sufficiently diverges a beam, it is preferable that the optical emission material is arranged to emit the beam.

Figure 9:
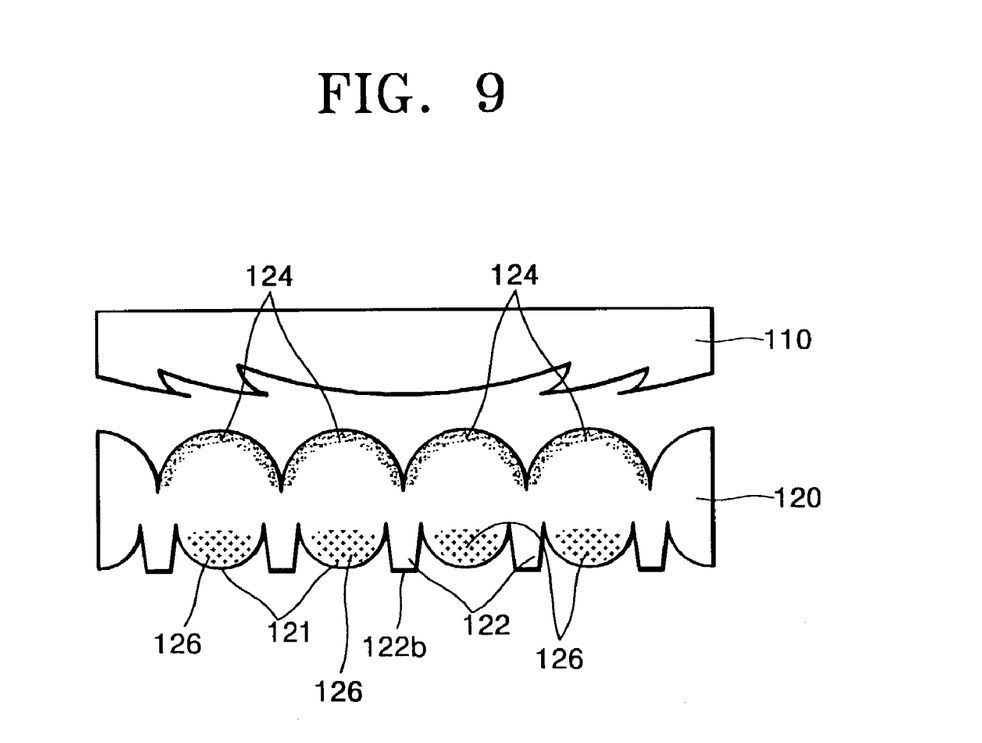
FIG. 9 is a plan view illustrating a fifth embodiment of a screen of a rear-type high-brightness projection television according to the present invention.

In particular, referring to FIG. 9, the optical emission material 124 is embedded in convex portions on the surface of the second lens means 120 that are adjacent to the first lens means 110, and a divergent agent 126 is embedded in convex portions between ridge portions 122 of an optical emission surface. In this case, the divergent agent 126 is glass powder or polymer powder that has a predetermined particle diameter. Since the profile of the divergent beam changes according to the diameter of the particles of the divergent agent 126, the profile of the divergent beam can be adjusted by controlling the particle diameter of the divergent agent.

<Sixth Embodiment>

Figure 10:
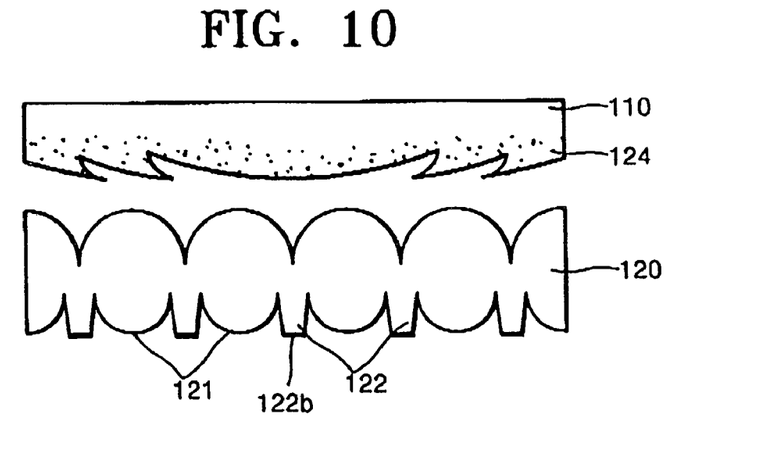
FIG. 10 is a plan view illustrating a sixth embodiment of a screen of a rear-type high-brightness projection television according to the present invention.

Referring to FIG. 10, the optical emission material 124 is embedded in the first lens means 110. In this case, the optical emission material 124 is embedded in a region of the first lens means 110 that is adjacent to the second lens means 120, namely the surface for refracting and emitting a beam toward the second lens means 120.

Accordingly, when the beam projected from a projection unit (not shown) passes through the first lens means 110, visible lights are input to the second lens means 120 while the optical emission material 124 converts invisible wavelengths, i.e., ultraviolet, into visible lights. As a result, the amount of visible lights input from the first lens means 110 to the second lens means 120 increases.

Figure 14:
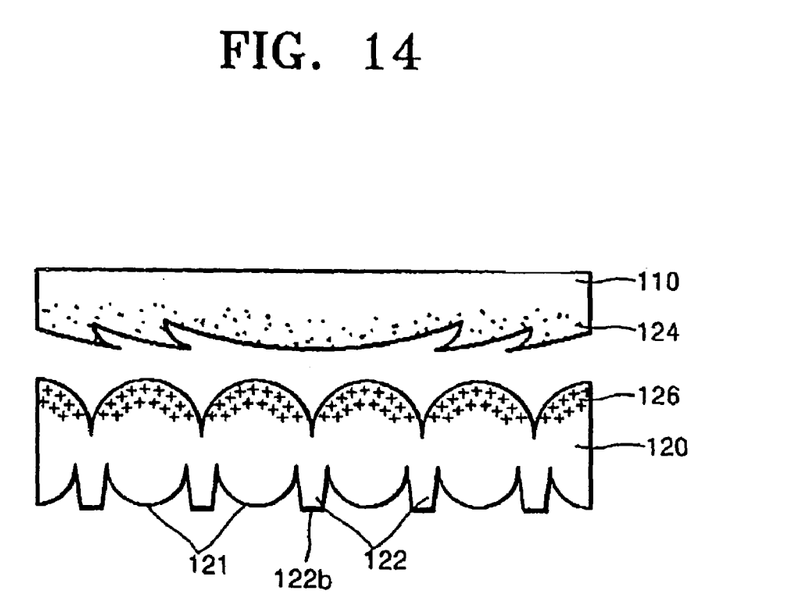
FIG. 14 is a plan view illustrating another preferred embodiment of a screen of a rear-type high-brightness projection television according to the present invention.

On the one hand, since the optical emission material 124 embedded in the first lens means 110 improves brightness and diverges the beam, no additional divergent agent is required. Nevertheless, a predetermined divergent agent 126 (as shown in FIG. 14) may be embedded in convex portions of the optical emission surface of the second lens means 120.

On the other hand, in the case that the optical emission material 124 embedded in the first lens means 110 is a fluorescent substance selected from the group consisting of red, blue, and green fluorescent substances, another fluorescent substance different from the one embedded in the first lens means 110 may be embedded in the second lens means 120. In this case, the distribution of the optical emission material 124 in the second lens means 120 may be as in any of the above-described first through fourth embodiments of a screen according to the present invention.

<Seventh Embodiment>

Figure 11:
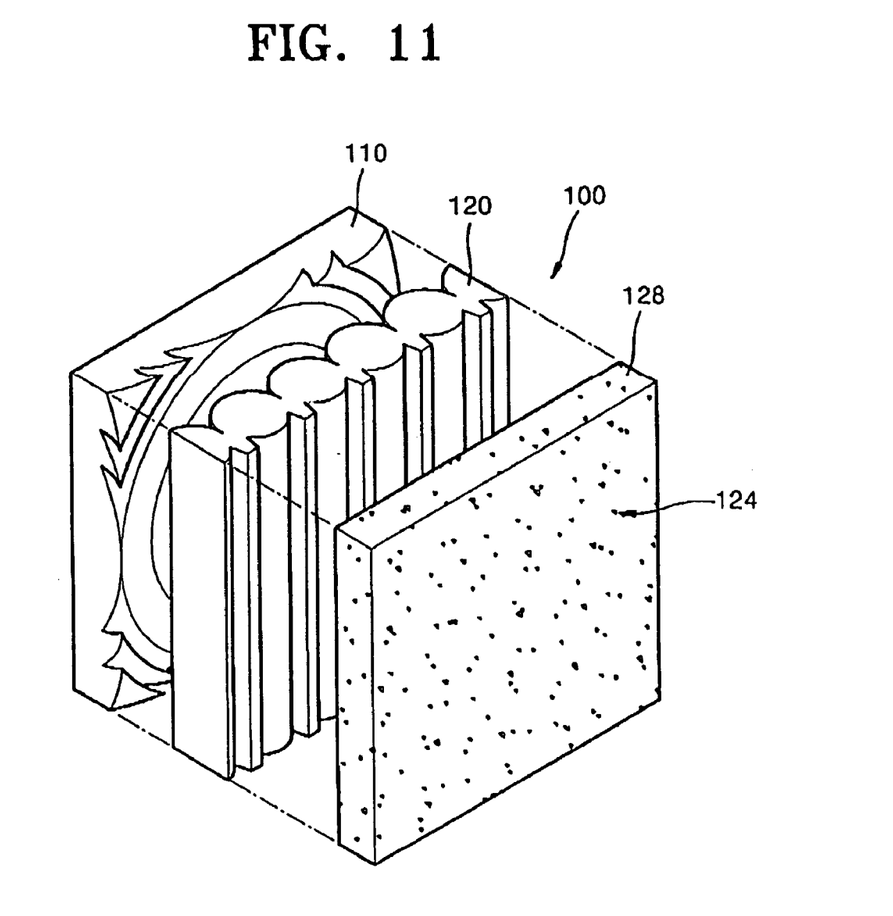
FIG. 11 is an exploded perspective view illustrating a seventh embodiment of a screen of a rear-type high-brightness projection television according to the present invention.

Referring to FIG. 11, a screen 100 consists of the first and second lens means 110 and 120 and a protection plate 128, wherein the protection plate 128 includes the optical emission material 124.

By using the screen according to the embodiments consistent with the present invention described above, the brightness of a projection television is improved and the range of angles of view of the projection television is increased. A rear-type projection television for improving brightness and angle of view by arranging an optical emission means in an optical path from a light source to a screen will be described below.

Figure 12:
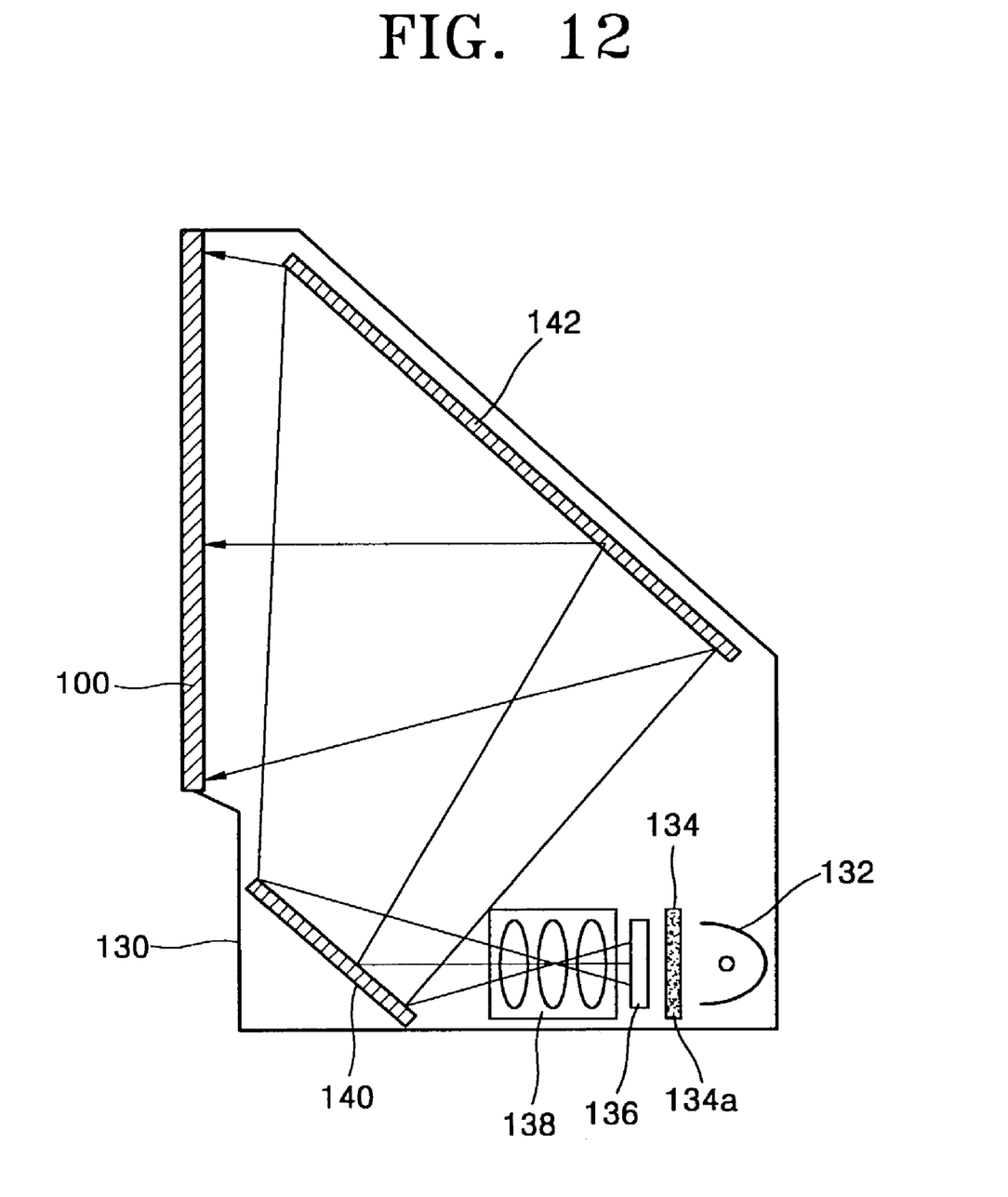
FIG. 12 is a sectional view illustrating a preferred embodiment of a rear-type high-brightness projection television with optical projection means between image generation means and a light source according to the present invention.

Referring to FIG. 12, an embodiment of a rear-type high-brightness projection television according to the present invention includes a screen 100 on which images are displayed on a front surface of a cabinet 130. A slanted second mirror 142 is placed on a rear surface of the cabinet 130 to face the screen 100. A projection unit is installed in a lower portion of the cabinet 130 to project a beam having predetermined image information onto the screen 100 through the second mirror 142.

In this case, the projection unit is formed of a light source 132 such as xenon, metal halide, or an ultra-high performance (UHP) lamp that radiates a beam by using halogen or xenon; a liquid crystal display (LCD) 136 which is used as an image generation means for generating images by using image signals input from a separate image signal source; an optical emission means 134 arranged between the light source 132 and the LCD 136 to convert an invisible portion of the beam incident from the light source 132 into visible lights and transmit the converted visible lights along with an originally visible portion of the beam incident from the light source 132 to the LCD 136; a projection lens unit 138 for magnifying and projecting the image generated by the LCD 136; and a first mirror 140 for reflecting the magnified image to the second mirror 142.

In this case, the optical emission means 134, having a fluorescent characteristic, absorbs incident light and emits light having a longer wavelength. In addition, the optical emission means 134 is formed of a layer having high transmittance, and preferably of a fluorescent layer having high transmittance by uniformly distributing a predetermined fluorescent substance 134a. The optical emission means 134 may be formed of a material to which a fluorescent substance is applied.

It is preferable that the fluorescent substance has a fluorescent characteristic as described in the first embodiment. The projection lens unit 138 may have various arrangements of lenses to align optical axes or resolve optical aberration. The LCD 136 can be a reflection-type or a transmission-type, or can be formed of a digital micromirror device (DMD).

Figure 13:
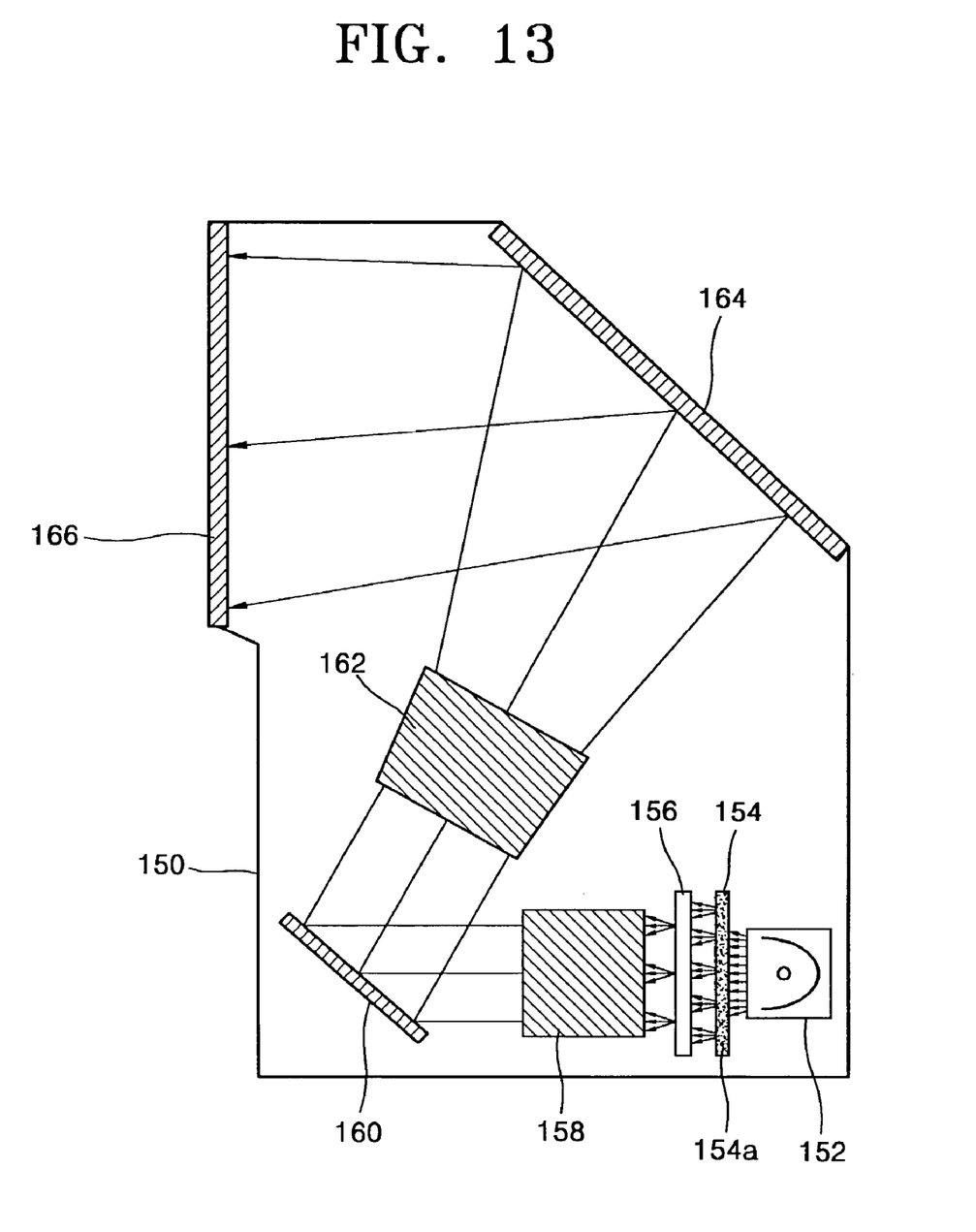
FIG. 13 is a sectional view illustrating another preferred embodiment of a rear-type high-brightness projection television with optical projection means between image generation means and a light source according to the present invention.

Referring to FIG. 13, another embodiment of a rear-type high-brightness projection television according to the present invention will be described, wherein descriptions of components that are the same as in the previous embodiment will be omitted.

A cabinet 150 has a screen 166 on a front surface, and a slanted mirror 164 behind and separate from the screen 166. The cabinet 150 includes a projection unit for projecting an image onto the mirror 164. The projection unit has a light source 152, an LCD 156 as an image generation means, an optical emission means 154 formed between the light source 152 and the LCD 156 and having a predetermined fluorescent substance 154a, a first projection lens unit 158 for projecting the image, an optical axis conversion means 160 for bending the direction of an optical axis of the image projected from the first projection lens unit 158, and a second projection lens unit 162 for magnifying and projecting the image incident from the optical conversion means 160. Although it is preferable that the optical conversion means 160 is a mirror, a prism or a polygon mirror can be used instead.

It is noted that the present invention is not limited to the preferred embodiments described above, and it is apparent that variations and modifications by those skilled in the art can be effected within the spirit and scope of the present invention defined in the appended claims. For example, the fluorescent substance may be applied in stripes to the optical emission layer arranged between the light source and the image generation means, instead of being distributed uniformly. In addition, fluorescent films may be attached to the protection plate of a screen so as to cover the entire surface of the protection plate or uniformly distributed tiny areas. An additional optical emission layer corresponding to the main optical emission layer may be coated on one surface of the optical refraction element arranged between the image generation means and the light source. The screen having the fluorescent substance or the fluorescent layer can be arranged in the rear-type projection television using a cathode ray tube (CRT) as the image generation means, and the fluorescent layer may be arranged in a front-type projection television using a CRT or an LCD as an image generation means. Therefore, the scope of the invention should be determined by the claims.

As described above, a high-brightness projection television according to the present invention includes a screen having a fluorescent substance that converts ultraviolet and near ultraviolet lights into visible lights, or a fluorescent layer having the fluorescent substance, between a light source and an image generation means. Due to the screen or the fluorescent layer, brightness of the television in a visible region is improved. In addition, since the fluorescent substance has a divergent function, the television can be viewed at wide vertical and horizontal angles.

What is claimed is:

1. A rear-type high-brightness projection television comprising:
   a light source;
   an image generation means for forming a predetermined image;
   a first projection lens unit for magnifying and projecting the image generated in the image generation means;
   a means for reflecting the image projected from the first projection lens unit;
   a screen on which the image reflected from the reflection means is displayed; and
   an optical emission means, arranged between the light source and the image generation means, for converting invisible lights incident from the light source into visible lights and emitting the visible lights.

2. The rear-type high-brightness projection television of claim 1, wherein the optical emission means is an optical emission layer having a high transmittance, which absorbs ultraviolet and near ultraviolet lights to emit visible lights.

3. The rear-type high-brightness projection television of claim 2, wherein the optical emission layer is a fluorescent layer in which a predetermined amount of fluorescent substance is uniformly distributed.

4. The rear-type high-brightness projection television of claim 3, wherein the fluorescent substance is at least one selected from the group consisting of blue, green, and red fluorescent substances.

5. The rear-type high-brightness projection television of claim 4, wherein the fluorescent substance is a mixture in which at least two different fluorescent substances are mixed according to a mixing ratio determined according to a chromaticity of the projection television.

6. The rear-type high-brightness projection television of claim 4, wherein the blue, green, and red fluorescent substances are $ZnS:Ag$, $ZnSiO_4:Mn$, and $Zn_3(PO_4)_2:Mn$, respectively.

7. The rear-type high-brightness projection television of claim 1, wherein the reflection means comprises:
   an optical axis conversion means for bending an optical axis of an image projected from the first projection lens unit; and
   a second mirror for reflecting the image projected from the optical axis conversion means to the screen.

8. The rear-type high-brightness projection television of claim 7, wherein a second projection lens unit is further included between the optical axis conversion means and the second mirror.

9. A rear-type high-brightness projection television screen comprising:
   a first lens means for refracting an incident beam into a convergent beam;
   a second lens means for refracting the beam refracted by the first lens means into a divergent beam; and
   a protection plate for protecting at least the second lens means,
   wherein an optical emission material is included on at least one of the first lens means, the second lens means, and the protection plate, to convert invisible lights included in the incident beam into visible lights.

10. The rear-type high-brightness projection television screen of claim 9, wherein the optical emission material is embedded in a region of the second lens means that is adjacent to the protection plate.

11. The rear-type high-brightness projection television screen of claim 9, wherein the optical emission material is embedded in a region of the second lens means that is adjacent to the first lens means.

12. The rear-type high-brightness projection television screen of claim 9, wherein the optical emission material is embedded in regions of the second lens means that are adjacent to the protection plate and the first lens means.

13. The rear-type high-brightness projection television screen of claim 11, wherein a divergent agent for diverging the incident beam is embedded in a region of the second lens means that is adjacent to the first lens means.

14. The rear-type high-brightness projection television screen of claim 9, wherein the optical emission material is uniformly distributed throughout a region of the second lens means through which light is transmitted.

15. The rear-type high-brightness projection television screen of claim 9, wherein the optical emission material is embedded in a region of the first lens means that is adjacent to the second lens means.

16. The rear-type high-brightness projection television screen of claim 9, wherein the optical emission material is uniformly distributed in the protection plate.

17. The rear-type high-brightness projection television screen of claim 15, wherein a divergent agent for diverging the incident beam is embedded in a region of the second lens means that is adjacent to the protection plate.

18. The rear-type high-brightness projection television screen of claim 16, wherein a divergent agent for diverging the incident beam is distributed in a region of the second lens means that is adjacent to the protection plate.

19. The rear-type high-brightness projection television screen of claim 9, wherein the optical emission material is a fluorescent substance that converts ultraviolet and near ultraviolet lights into visible lights.

20. The rear-type high-brightness projection television screen of claim 19, wherein the fluorescent substance is at least one selected from the group consisting of blue, green, and red fluorescent substances.

21. The rear-type high-brightness projection television screen of claim 20, wherein the fluorescent substance is a mixture in which at least two different fluorescent substances are mixed according to a mixing ratio determined according to a chromaticity of the projection television.

22. The rear-type high-brightness projection television screen of claim 20, wherein the blue, green, and red fluorescent substances are $ZnS:Ag$, $ZnSiO_4:Mn$, and $Zn_3(PO_4)_2:Mn$, respectively.

* * * * *